(12) United States Patent
Sun et al.

(10) Patent No.: US 9,081,862 B2
(45) Date of Patent: Jul. 14, 2015

(54) METHOD AND DEVICE FOR RESOURCE SHARING

(71) Applicant: TENCENT TECHNOLOGY (SHENZHEN) COMPANY LIMITED, Shenzhen (CN)

(72) Inventors: Haoran Sun, Shenzhen (CN); Liang Zeng, Shenzhen (CN); Jiangquan Huang, Shenzhen (CN); Lei Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/138,072

(22) Filed: Dec. 22, 2013

(65) Prior Publication Data

US 2014/0103108 A1    Apr. 17, 2014

Related U.S. Application Data

(63) Continuation of application No. PCT/CN2013/083735, filed on Sep. 18, 2013.

(30) Foreign Application Priority Data

Sep. 19, 2012  (CN) .......................... 2012 1 0349210

(51) Int. Cl.
*G06F 17/00* (2006.01)
*G06F 17/30* (2006.01)
(Continued)

(52) U.S. Cl.
CPC .... *G06F 17/30879* (2013.01); *G06K 19/06037* (2013.01); *H04L 67/02* (2013.01); *H04L 67/10* (2013.01)

(58) Field of Classification Search
CPC ............. G06F 17/00; G06F 7/00; G06K 5/00; G06K 9/18; G06K 7/12; G06K 7/10; G06K 7/00; G06K 19/00; G09Q 30/0267; G06Q 20/322; G06Q 30/0222; G06Q 20/3276
USPC .................... 235/375, 376, 382, 487, 462.46, 235/472.02, 486, 462.09
See application file for complete search history.

(56) References Cited

U.S. PATENT DOCUMENTS

| | | | | |
|---|---|---|---|---|
| 2009/0117883 | A1* | 5/2009 | Coffing et al. | 455/414.1 |
| 2012/0150750 | A1* | 6/2012 | Law et al. | 705/76 |
| 2012/0209749 | A1* | 8/2012 | Hammad et al. | 705/27.1 |

(Continued)

FOREIGN PATENT DOCUMENTS

| CN | 1867142 A | 11/2006 |
|---|---|---|
| CN | 1905701 A | 1/2007 |

(Continued)

*Primary Examiner* — Edwyn Labaze
(74) *Attorney, Agent, or Firm* — Anova Law Group, PLLC

(57) ABSTRACT

Methods and devices for resource sharing are disclosed. Address information of a resource to be shared can be acquired by a user device in response to a sharing request. A two-dimensional barcode corresponding to the address information of the resource can be generated by the user device. The generated two-dimensional barcode can be published by the user device to one or more of an Internet platform and a specified Internet communication application client via a network. The user device can include a first acquisition module, a generating module, and a publishing module.

17 Claims, 6 Drawing Sheets

(51) Int. Cl.
*G06K 19/06* (2006.01)
*H04L 29/08* (2006.01)

(56) References Cited

U.S. PATENT DOCUMENTS

| | | | |
|---|---|---|---|
| 2012/0239618 A1* | 9/2012 | Kung | 707/621 |
| 2013/0094538 A1* | 4/2013 | Wang | 375/141 |
| 2013/0221084 A1* | 8/2013 | Doss et al. | 235/375 |
| 2013/0346302 A1* | 12/2013 | Purves et al. | 705/40 |
| 2014/0095888 A1* | 4/2014 | Dougharty et al. | 713/189 |
| 2014/0203071 A1* | 7/2014 | Eggert | 235/375 |
| 2014/0325328 A1* | 10/2014 | Beadles | 715/208 |
| 2014/0351335 A1* | 11/2014 | Le Huerou et al. | 709/204 |

FOREIGN PATENT DOCUMENTS

| | | |
|---|---|---|
| CN | 101165726 A | 4/2008 |
| CN | 101471855 A | 7/2009 |
| CN | 101727637 A | 6/2010 |
| CN | 102663601 A | 9/2012 |

* cited by examiner

METHOD AND DEVICE FOR RESOURCE SHARING

CROSS-REFERENCES TO RELATED APPLICATIONS

This application is a continuation application of PCT Patent Application No. PCT/CN2013/083735, filed on Sep. 18, 2013, which claims priority to Chinese Patent Application No. CN201210349210.2, filed on Sep. 19, 2012, the entire contents of all of which are incorporated herein by reference.

FIELD OF THE DISCLOSURE

The present disclosure relates to the field of Internet technology and, more particularly, relates to methods and devices for resource sharing.

BACKGROUND

Currently, some Internet applications (e.g., the Tencent browser) provide users with a function to share a network resource (e.g., a web page and a network video) with other users. In a conventional network resource sharing mechanism, a user directly shares, via a network, a corresponding URL (Uniform/Universal Resource Locator) of a network resource on a specific Internet platform (e.g., QQ space and micro-blog). Researches and practices indicate that there are still more room to improve in the areas of security, privacy and operational convenience for the conventional network resource sharing mechanism.

BRIEF SUMMARY OF THE DISCLOSURE

According to various embodiments, there is provided a resource sharing method. Address information of a resource to be shared can be acquired by a user device in response to a sharing request. A two-dimensional barcode corresponding to the address information of the resource can be generated by the user device. The generated two-dimensional barcode can be published by the user device to one or more of an Internet platform and a specified Internet communication application client via a network.

According to various embodiments, there is also provided a resource sharing method. A two-dimensional barcode that is published to one or more of an Internet platform and an Internet communication application client via a network can be acquired by a user device. The two-dimensional barcode can be interpreted by the user device to acquire address information of a resource corresponding to the two-dimensional barcode. The resource can be accessed by the user device based on the address information.

According to various embodiments, there is further provided a user device. The user device can include a first acquisition module, a generating module, and a publishing module. The first acquisition module can be configured to acquire address information of a resource to be shared in response to a sharing request. The generating module can be configured to generate a two-dimensional barcode corresponding to the address information, based on the address information acquired by the first acquisition module. The publishing module can be configured to publish, via a network, the two-dimensional barcode generated by the generating module to one or more of an Internet platform and an Internet communication application client.

According to various embodiments, there is further provided a user device. The user device can include a second acquisition module, an interpreting module, and an accessing module. The second acquisition module can be configured to acquire a two-dimensional barcode that is published to one or more of an Internet platform and an Internet communication application client via a network. The interpreting module can be configured to interpret the two-dimensional barcode acquired by the second acquisition module to acquire address information of a resource. The accessing module can be configured to access the resource based on the address information acquired by the interpreting module.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Various embodiments provide methods and devices for resource sharing in order to improve security and privacy of the resource sharing. For example, a resource sharing method can include: acquiring, in response to a sharing request, address information of a resource to be shared; generating a two-dimensional barcode corresponding to the address information; and publishing the generated two-dimensional barcode to an Internet platform via a network and/or publishing the generated two-dimensional barcode to a specified Internet communication application client via a network.

As used herein, the device can be a user device including, such as, for example, a personal computer (PC), a work station computer, a notebook computer, a car computer (e.g., carrying in a car or other vehicles), a server computer, a hand-held computing device (e.g., a tablet computer), a mobile terminal (e.g., a mobile phone, a smart phone, an iPad, or an aPad), a POS (i.e., point of sale) device, or any other user-side computing device.

Figure 1:
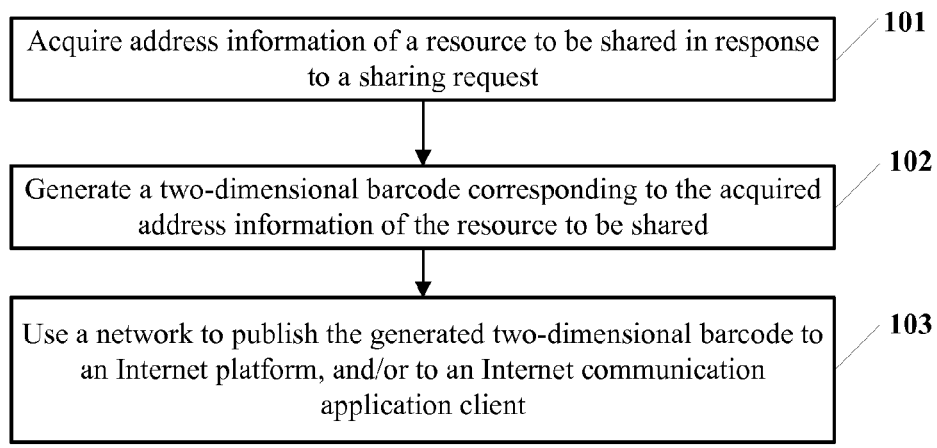
FIG. 1 depicts an exemplary method for resource sharing in accordance with various disclosed embodiments.

FIG. 1 is a schematic flow diagram illustrating an exemplary method for resource sharing in accordance with various disclosed embodiments.

In Step 101, in response to a sharing request, address information of a resource to be shared can be acquired.

As disclosed herein, the term "resource" refers to various Internet resources to be shared including, for example, a web page, an image, a video, an audio, and/or any other suitable Internet resource that can be accessed by a corresponding client. Corresponding address information of a resource to be shared can be used to describe an access address of the resource to be shared. The corresponding address information of a resource to be shared can be, for example, URL information of the resource to be shared and/or other suitable address information.

According to different application scenarios, the way to acquire corresponding address information of a resource to be shared may be different. One way can be to acquire corresponding address information of a resource to be shared according to a user command (e.g., a sharing request). For example, corresponding address information of a resource to be shared that a user is currently accessing can be acquired. Or, corresponding address information of a resource to be shared that is input by a user can be acquired. Or, corresponding address information of a resource to be shared that is specified by a user via a command can be acquired. Or, corresponding address information of a resource to be shared that is found via a search on a network can be acquired. Or, corresponding address information of a resource to be shared can be acquired from a configuration file (e.g., the configuration file can be, for example, locally stored).

In Step 102, a two-dimensional barcode (e.g., QR code or quick response code) corresponding to the acquired corresponding address information of the resource to be shared can be generated.

In some embodiments, a corresponding two-dimensional barcode of the acquired address information can be generated automatically (e.g., when triggered by a specific event) or according to a user command. An algorithm used to generate the two-dimensional barcode can be arbitrary and randomly selected (for example, randomly selected from a plurality of alternative algorithms), set to a default setting, or specified by a user via a command.

In Step 103, the generated two-dimensional barcode can be published to an Internet platform and/or to a specified Internet communication application client using a network.

In some embodiments, the generated two-dimensional barcode can be encrypted and then published via a network to an Internet platform, and/or the generated two-dimensional barcode can be encrypted and then published via a network to a specified Internet communication application client. In this manner, targets of resource sharing can be controlled via an encryption password. For example, targets of resource sharing can be controlled via an agreement or notification of an encryption password. When a target is not informed of an encryption password, the target cannot interpret a corresponding two-dimensional barcode of corresponding address information of a resource to be shared and thus cannot access the sharing resource.

As used herein, the term "Internet platform" refers to, for example, an Internet social platform (e.g., QQ space, microblog, and FaceBook) that can be accessed by a corresponding client (e.g., a browser) and/or an Internet website platform (e.g., portals such as Tencent, Netease, Youku, and Tudou, audio and video service web sites and other types of web sites). As used herein, the term "Internet communication application client" refers to, for example, an Internet mail client, an Internet instant messaging client (e.g., QQ instant messaging) and/or other suitable Internet communication application clients.

The above-described method can be specifically implemented on a user device, for example, can be specifically implemented in a software and/or hardware module arranged in the user device. In one embodiment, the above-described method can be specifically implemented in a browser installed on the user device. The user device can be, for example, a mobile phone, a tablet computer, a personal computer, or other user device with network access capability.

As disclosed herein, an operation performed by any one module in the user device can be described as an operation performed by the user device and can also be described as an operation performed by a module in the user device, and so on.

Therefore, in the exemplary resource sharing method, a user device can acquire address information of a resource to be shared, generate a two-dimensional barcode corresponding to the address information of the resource to be shared, and publish via a network the two-dimensional barcode to an Internet platform and/or to an Internet communication application client. The resource sharing can be performed by publishing a two-dimensional barcode. Therefore, this method can help improve security, privacy, and operational convenience for sharing resources via network.

Further, by encrypting the published two-dimensional barcode corresponding to the address information of the resource to be shared, targets of the resource sharing can also be controlled. This can help further improve the security and privacy of the network resource sharing.

Various embodiments can also include a resource sharing method by acquiring a two-dimensional barcode that is published via a network to an Internet platform and/or an Internet communication application client; interpreting the two-dimensional barcode to acquire corresponding address information of a resource to be shared; and accessing the resource based on the address information.

Figure 2:
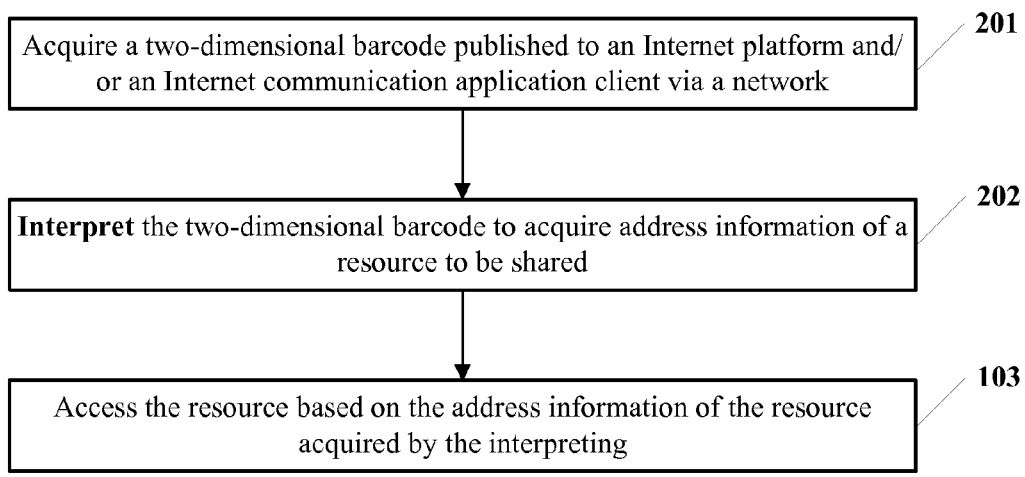
FIG. 2 depicts another exemplary method for resource sharing in accordance with various disclosed embodiments.

FIG. 2 is a schematic flow diagram illustrating another exemplary method for resource sharing in accordance with various disclosed embodiments.

In Step 201, a two-dimensional barcode that is published via a network to an Internet platform and/or an Internet communication application client can be acquired.

In some embodiments, there can be various ways for a two-dimensional barcode publishing side to publish a two-dimensional barcode via a network. For example, a two-dimensional barcode can be published via a network to an Internet platform and/or to a specified Internet communication application client. The Internet platform mentioned in various embodiments of the present disclosure refers to, for example, an Internet social platform (e.g., QQ space, microblog, and FaceBook) that can be accessed by a corresponding client (e.g., a browser) and/or an Internet website platform (e.g., portals including Tencent, Netease, Youku, and Tudou, and/or audio and video service web sites). The Internet communication application client disclosed herein refers to, for example, an Internet mail client, an Internet instant messaging client (e.g., QQ), or other Internet communication application clients.

Therefore, depending on how a two-dimensional barcode publishing side publishes, via a network, a two-dimensional barcode, a two-dimensional barcode acquiring side can acquire the two-dimensional barcode that is published via the network in a different manner. For example, when a two-dimensional barcode publishing side publishes, via the network, a two-dimensional barcode to an Internet platform, a two-dimensional barcode acquiring side can acquire, from the Internet platform, the two-dimensional barcode published via the network. When a two-dimensional barcode publishing side publishes, via the network, a two-dimensional barcode to a specified Internet communication application client, a two-dimensional barcode acquiring side can acquire, via the Internet communication application client, the two-dimensional barcode that is published via the network.

In Step 202, the acquired two-dimensional barcode can be interpreted to acquire corresponding address information of a resource to be shared.

In some embodiments, after acquiring a two-dimensional barcode that is published via a network, for example, the acquired two-dimensional barcode can be interpret automatically (e.g., when triggered by a specific event) or according to a user command to acquire corresponding address information of a resource to be shared.

In some embodiments, when the acquired two-dimensional barcode is encrypted, an encryption password can be acquired to decrypt the acquired two-dimensional barcode, or the acquired two-dimensional barcode can be decrypted according to an agreed encryption password. After decrypting the acquired two-dimensional barcode, the decrypted two-dimensional barcode can be interpreted to acquire corresponding address information of a resource to be shared. In this way, targets of resource sharing can be controlled via an encryption password. For example, targets of resource sharing can be controlled via an agreement or notification of an encryption password. When a target is not informed of an encryption password, the target cannot interpret a corresponding two-dimensional barcode of corresponding address information of a resource to be shared and thus cannot access the sharing resource.

In Step 203, the resource can be accessed based on the corresponding address information of the resource that is acquired by interpreting.

In some embodiments, the resource to be shared can be accessed automatically (e.g., when triggered by a specific event) or according to a user command, based on the corresponding address information of the resource to be shared that is acquired by the analysis.

The above-described method of the present embodiment can be specifically implemented on a user device, for example, can be specifically implemented in a software and/or hardware module arranged in a user device (for example, can be specifically implemented in a browser installed on a user device). The user device can be, for example, a mobile phone, a tablet computer, a personal computer, or other user device with network access capability.

As used herein, an operation performed by any one module in the user device can be described as an operation performed by the user device and/or described as an operation performed by a module in the user device, and so on.

Therefore, in the exemplary resource sharing method, a user device can acquire a two-dimensional barcode that is published via a network to an Internet platform and/or to an Internet communication application client; interpret the two-dimensional barcode to acquire corresponding address information of a resource to be shared; and access the resource based on the address information. The resource sharing is performed by publishing a two-dimensional barcode. Therefore, this method can help improve security, privacy and operational convenience for sharing resources via network.

Further, by encrypting the published two-dimensional barcode corresponding to the address information of the resource to be shared, targets of the resource sharing can also be controlled. This can help further improve the security and privacy of the network resource sharing.

Figure 3A:
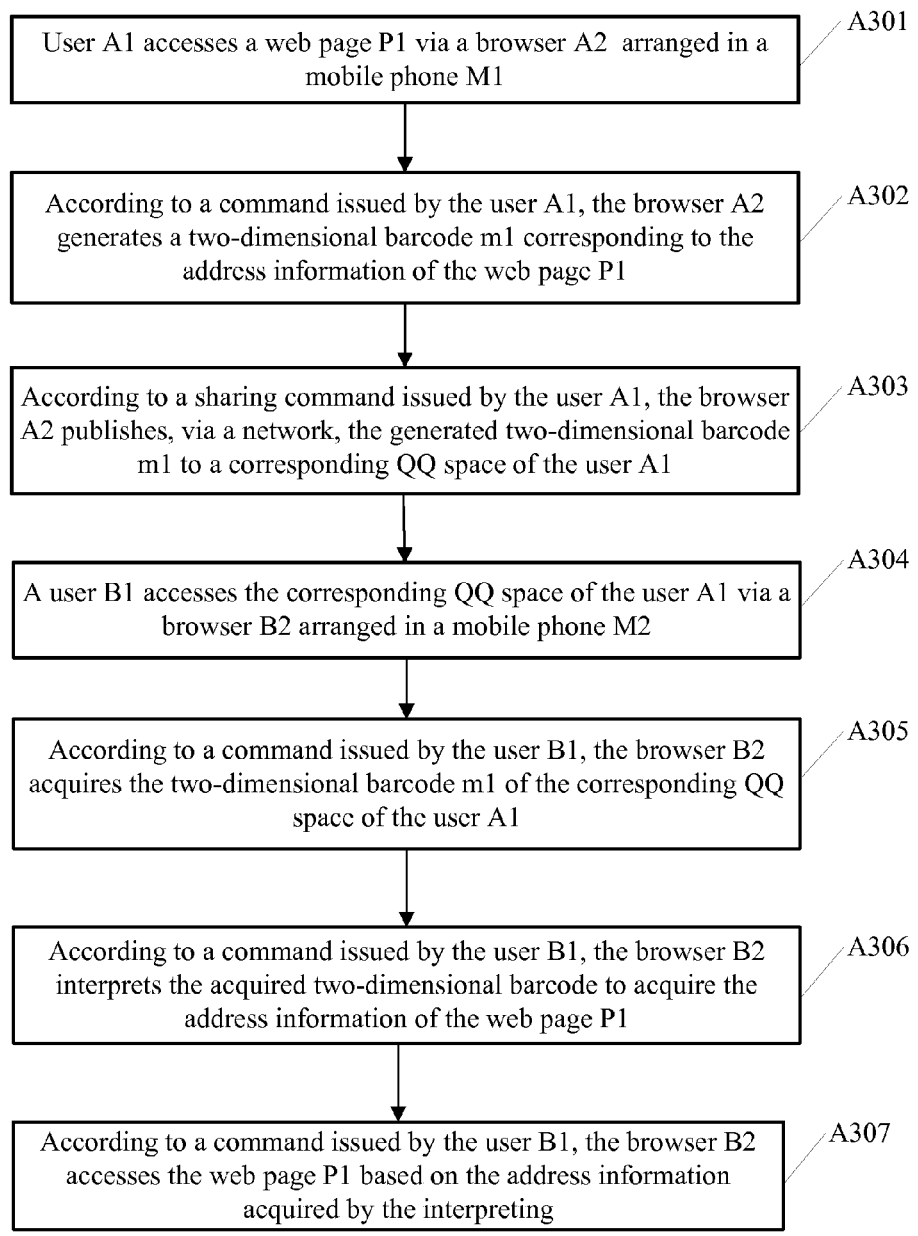
FIGS. 3A-3C depict exemplary methods for resource sharing in accordance with various disclosed embodiments.
Figure 3B:
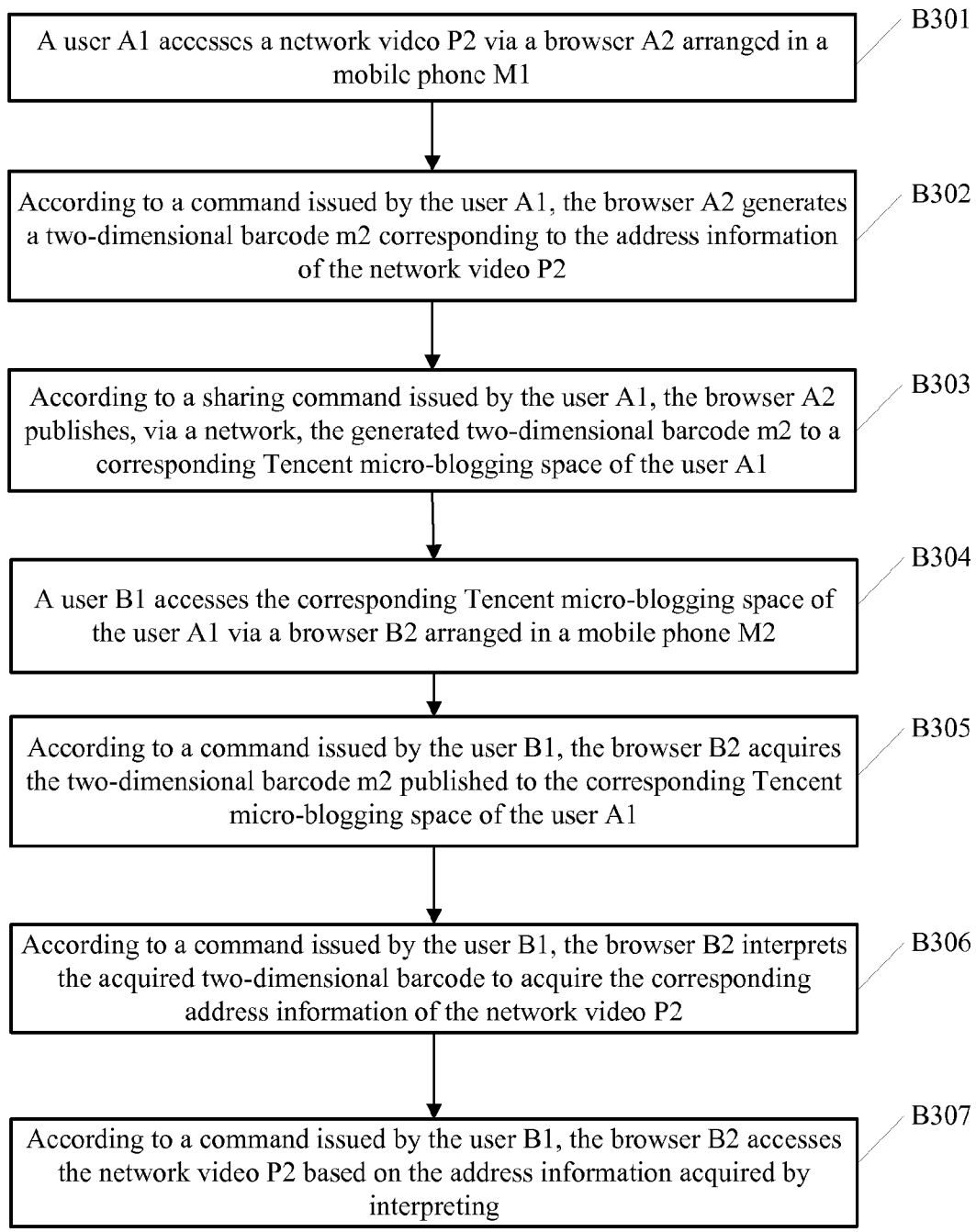
Figure 3C:
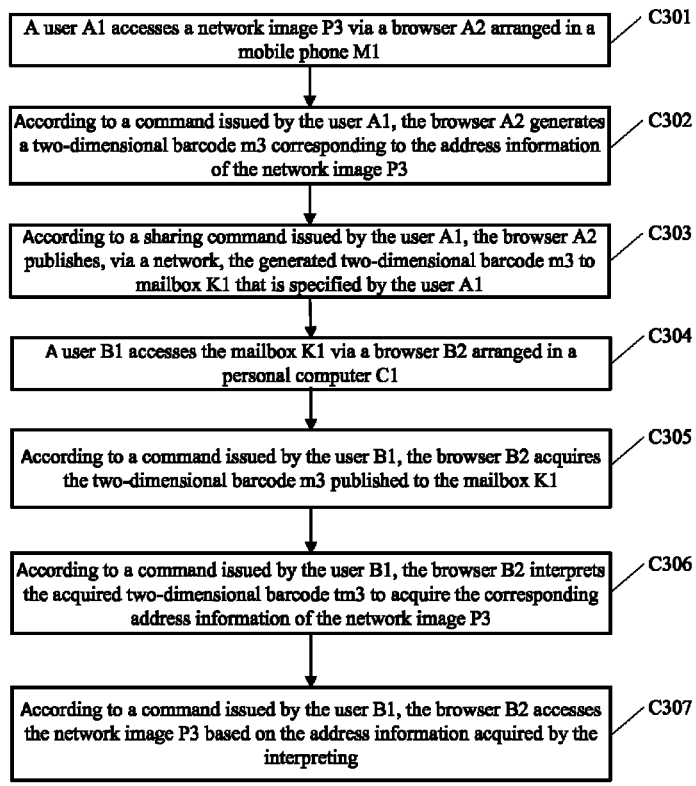

FIGS. 3A-3C depict exemplary application scenarios for better understanding exemplary methods for resource sharing in accordance with various disclosed embodiments.

In Step A301 of FIG. 3A, user A1 accesses a web page P1 via a browser A2 that is arranged in a mobile phone M1. When the browser A2 that is arranged in the mobile phone M1 accesses the web page P1, the browser A2 can acquire address information of the web page P1 in response to a sharing request.

In Step A302, according to a command for generating a two-dimensional barcode issued by the user A1, the browser A2 generates a two-dimensional barcode m1 corresponding to the address information of the web page P1.

In Step A303, according to a sharing command issued by the user A1, the browser A2 publishes, via a network, the generated two-dimensional barcode m1 to a corresponding QQ space of the user A1.

In Step A304, a user B1 accesses the corresponding QQ space of the user A1 via a browser B2 that is arranged in a mobile phone M2.

In Step A305, according to a command issued by the user B1, the browser B2 acquires the two-dimensional barcode m1 of the corresponding QQ space of the user A1.

In Step A306, according to a command issued by the user B1, the browser B2 interprets the acquired two-dimensional barcode to acquire the corresponding address information of the web page P1.

In Step A307, according to a command issued by the user B1, the browser B2 accesses the web page P1 based on the address information that is acquired by the interpreting.

FIG. 3B depicts another exemplary resource sharing method in accordance with various disclosed embodiments.

In Step B301, a user A1 accesses a network video P2 via a browser A2 that is arranged in a mobile phone M1. When the browser A2 arranged in the mobile phone M1 accesses the network video P2, the browser A2 can acquire address information of the network video P2 in response to a sharing request.

In Step B302, according to a command for generating a two-dimensional barcode issued by the user A1, the browser A2 generates a two-dimensional barcode m2 corresponding to the address information of the network video P2.

In Step B303, according to a sharing command issued by the user A1, the browser A2 publishes, via a network, the generated two-dimensional barcode m2 to a corresponding Tencent micro-blogging space of the user A1.

In Step B304, a user B1 accesses the corresponding Tencent micro-blogging space of the user A1 via a browser B2 that is arranged in a mobile phone M2.

In Step B305, according to a command issued by the user B1, the browser B2 acquires the two-dimensional barcode m2 that is published to the corresponding Tencent micro-blogging space of the user A1.

In Step B306, according to a command issued by the user B1, the browser B2 interprets the acquired two-dimensional barcode to acquire the corresponding address information of the network video P2.

In Step B307, according to a command issued by the user B1, the browser B2 accesses the network video P2 based on the address information that is acquired by interpreting.

FIG. 3C depicts another exemplary resource sharing method in accordance with various disclosed embodiments.

In Step C301, a user A1 accesses a network image P3 via a browser A2 that is arranged in a mobile phone M1. When the browser A2 that is arranged in the mobile phone M1 accesses the network image P3, the browser A2 can acquire address information of the network image P3 in response to a sharing request.

In Step C302, according to a command for generating a two-dimensional barcode issued by the user A1, the browser A2 generates a two-dimensional barcode m3 corresponding to the address information of the network image P3.

In Step C303, according to a sharing command issued by the user A1, the browser A2 publishes, via a network, the generated two-dimensional barcode m3 to mailbox K1 that is specified by the user A1.

In Step C304, a user B1 accesses the mailbox K1 via a browser B2 that is arranged in a personal computer C1.

In Step C305, according to a command issued by the user B1, the browser B2 acquires the two-dimensional barcode m3 that is published to the mailbox K1.

In Step C306, according to a command issued by the user B1, the browser B2 interprets the acquired two-dimensional barcode tm3 to acquire the corresponding address information of the network image P3.

In Step C307, according to a command issued by the user B1, the browser B2 accesses the network image P3 based on the address information that is acquired by the interpreting.

It should be noted that implementations depicted in FIGS. 3A-3C are examples for illustration purposes, suitable implementations in other application scenarios can be similarly performed. In addition, suitable devices can be used to implement the methods for resource sharing as disclosed herein.

Figure 4:
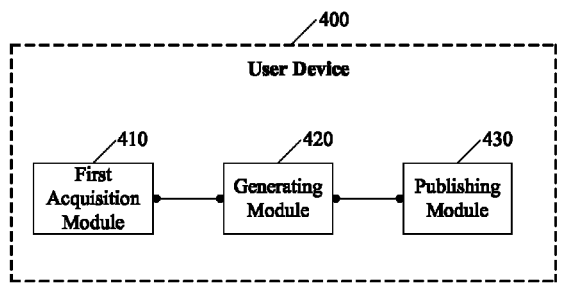
FIG. 4 depicts an exemplary user device for implementing a method for resource sharing in accordance with various disclosed embodiments.

FIG. 4 depicts an exemplary user device for implementing a method for resource sharing. For example, a user device 400 can include a first acquisition module 410, a generating module 420, and a publishing module 430.

The first acquisition module 410 can be used to acquire corresponding address information of a resource to be shared, in response to a sharing request.

The generating module 420 can be used to generate a two-dimensional barcode corresponding to the address information of the resource to be shared, based on the address information that is acquired by the first acquisition module 410.

The publishing module 430 can be used to publish, via a network, the two-dimensional barcode that is generated by the generating module 420 to an Internet platform and/or publish, via a network, the two-dimensional barcode that is generated by the generating module 420 to an Internet communication application client.

The first acquisition module 410 can acquire the corresponding address information of the resource to be shared in a manner according to specific application scenarios.

In some embodiments, the first acquisition module 410 can be specifically used to, in response to a sharing request, acquire corresponding address information of the resource to be shared that a user is currently accessing; or, in response to a sharing request, acquire corresponding address information of a resource to be shared that a user inputs; or, in response to a sharing request, acquire corresponding address information of a resource to be shared that is specified by a user command; or, in response to a sharing request, acquire corresponding address information of a resource to be shared that is found via a search on a network; or, in response to a sharing request, acquire corresponding address information of a resource to be shared from a configuration file.

In some embodiments, the generating module 420 can generate, automatically (e.g., when triggered by a specific event) or according to a user command, a two-dimensional barcode corresponding to the address information that is acquired by the first acquisition module 410. An algorithm that is used by the generating module 420 to generate the two-dimensional barcode can be arbitrary and randomly selected (for example, randomly selected from a plurality of alternative algorithms), set to a default setting, or specified by a user via a command.

In some embodiments, there can be various manners for the publishing module 430 to publish, via a network, the two-dimensional barcode.

In some embodiments, the publishing module 430 can encrypt the two-dimensional barcode that is generated by the generating module 420 and then publish, via a network, the encrypted two-dimensional barcode to an Internet platform, and/or encrypt the two-dimensional barcode that is generated by the generating module 420 and then publish, via a network, the encrypted two-dimensional barcode to a specified Internet communication application client. In this manner, targets of resource sharing can be controlled via an encryption password. For example, targets of resource sharing can be controlled via an agreement or notification of an encryption password. When a target is not informed of an encryption password, the target cannot interpret a corresponding two-dimensional barcode of corresponding address information of the resource to be shared and thus cannot access the sharing resource.

Figure 5:
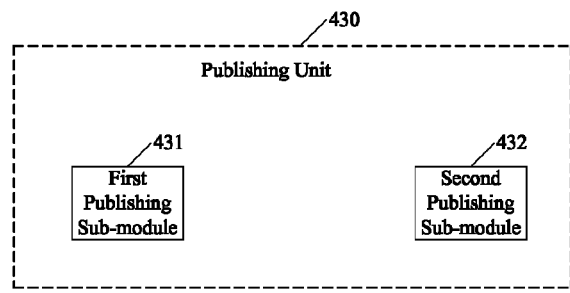
FIG. 5 depicts an exemplary publishing module in a user device in according with various disclosed embodiments.

FIG. 5 depicts an exemplary publishing module in a user device in according with various disclosed embodiments. The exemplary publishing module can be configured in the device depicted in FIG. 4. The exemplary publishing module 430 includes a first publishing sub-module 431 and/or a second publishing sub-module 432.

The first publishing sub-module 431 can be used to publish, via a network, the two-dimensional barcode that is generated by the generating module 420 to an Internet platform.

The second publishing sub-module 432 can be used to publish, via a network, the two-dimensional barcode that is generated by the generating module 420 to a specified Internet communication application client.

In some embodiments, the first publishing sub-module 431 can be specifically used to publish, automatically or according to a command issued by a user, via a network, the two-dimensional barcode that is generated by the generating module 420 to a specified Internet social platform and/or to an Internet website platform.

In some embodiments, the first publishing sub-module 431 can be specifically used to encrypt, automatically or according to a command issued by a user, the two-dimensional barcode that is generated by the generating module 420 and then publish, via a network, the encrypted two-dimensional barcode to a specified Internet social platform and/or to an Internet website platform.

In some embodiments, the second publishing sub-module 432 can be specifically used to encrypt, automatically or according to a command issued by a user, the two-dimensional barcode that is generated by the generating module 420 and thereafter publish, via a network, the encrypted two-dimensional barcode to a specified Internet communication application client.

The user device 400 depicted in FIG. 4 (and/or having the exemplary publishing module as depicted in FIG. 5) can be, for example, a mobile phone, a tablet computer, a personal computer, or any other suitable user device with network access capability. The function of each functional module/module of the user device 400 can be specifically realized.

As disclosed herein, the user device 400 can acquire address information of a resource to be shared, generate a two-dimensional barcode corresponding to the address information of the resource to be shared, and publish, via a network, the two-dimensional barcode to an Internet platform and/or to an Internet communication application client. The resource sharing is performed by publishing a two-dimensional barcode. Therefore, this can help improve security, privacy, and operational convenience for sharing network resources.

Further, by encrypting the published two-dimensional barcode corresponding to the address information of the resource to be shared, targets of the resource sharing can also be controlled. This can help further improve the security and privacy of the network resource sharing.

Figure 6:
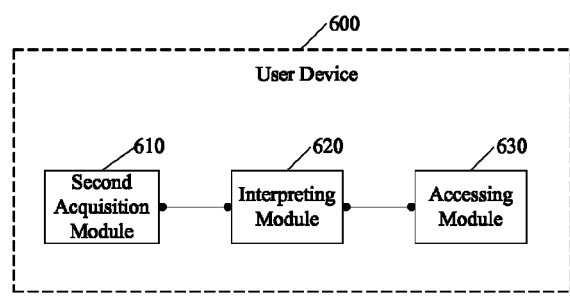
FIG. 6 depicts another exemplary user device for implementing a method for resource sharing in accordance with various disclosed embodiments.

FIG. 6 depicts another exemplary user device 600 in accordance with various disclosed embodiments. For example, the exemplary user device 600 includes a second acquisition module 610, an interpreting module 620, and/or an accessing module 630.

The second acquisition module 610 can be used to acquire a two-dimensional barcode that is published, via a network, to an Internet platform and/or an Internet communication application client.

In some embodiments, there can be various manners for a two-dimensional barcode publishing side to publish, via a network, a two-dimensional barcode. For example, a two-dimensional barcode can be published, via a network, to an Internet platform and/or to a specified Internet communication application client. The Internet platform disclosed herein refers to, for example, an Internet social platform (e.g., QQ space, micro-blog, and/or FaceBook) that can be accessed by a corresponding client (e.g., a browser) and/or an Internet website platform (e.g., portals including Tencent, Netease, Youku, and Tudou, and/or audio and video service web sites). The Internet communication application client disclosed herein refers to, for example, an Internet mail client, an Internet instant messaging client (such as QQ), or other Internet communication application clients.

Therefore, the second acquisition module 610 can acquire the two-dimensional barcode that is published via the network in a manner, depending on how a two-dimensional barcode publishing side publishes a two-dimensional barcode via a network. For example, when a two-dimensional barcode publishing side publishes a two-dimensional barcode via a network to an Internet platform, the second acquisition module 610 can acquire from the Internet platform the two-dimensional barcode that is published via the network. When a two-dimensional barcode publishing side publishes a two-dimensional barcode via a network to a specified Internet communication application client, the second acquisition module 610 can acquire, via the Internet communication application client, the two-dimensional barcode that is published via the network; and so on.

The interpreting module 620 can be used to interpret the two-dimensional barcode that is acquired by the second acquisition module 610 to acquire corresponding address information of the resource to be shared.

In some embodiments, after the second acquisition module 610 acquires a two-dimensional barcode that is published via a network, the interpreting module 620 can interpret, automatically (e.g., when triggered by a specific event) or according to a user command, the acquired two-dimensional barcode to acquire the corresponding address information of the resource to be shared.

In some embodiments, when the two-dimensional barcode that is acquired by the second acquisition module 610 is encrypted, the interpreting module 620 can acquire an encryption password to decrypt the acquired two-dimensional barcode, or the interpreting module 620 can decrypt the acquired two-dimensional barcode according to an agreed encryption password. After the interpreting module 620 has decrypted the acquired two-dimensional barcode, the interpreting module 620 can interpret the decrypted two-dimensional barcode to acquire corresponding address information of the resource to be shared.

The accessing module 630 can be used to access the resource to be shared based on the address information acquired by the interpreting module 620.

In some embodiments, the accessing module 630 can access, automatically (e.g., when triggered by a specific event) or according to a user command, the resource to be shared, based on the corresponding address information of the resource to be shared that is acquired by the interpreting.

The exemplary user device 600 can be, for example, a mobile phone, a tablet computer, a personal computer, or any other suitable user device with network access capability. The function of each functional module of the user device 600 can be specifically realized according to methods described herein.

The user device 600, as disclosed herein, can acquire a two-dimensional barcode that is published via a network to an Internet platform and/or to an Internet communication application client; interpret the two-dimensional barcode to acquire corresponding address information of a resource to be shared; and access the resource based on the address information. The resource sharing is performed by publishing a two-dimensional barcode. Therefore, this method can help improve security, privacy, and operational convenience of network resource sharing.

Further, by encrypting the published two-dimensional barcode corresponding to address information of the resource to be shared, targets of the resource sharing can also be controlled. This can help further improve the security and privacy of the network resource sharing.

Figure 7:
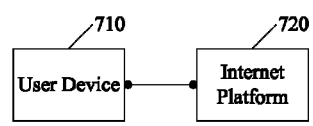
FIG. 7 depicts an exemplary communication system in accordance with various disclosed embodiments.

FIG. 7 depicts an exemplary communication system including a user device 710 and/or an Internet platform 720 in accordance with various disclosed embodiments. The user device 710 and the Internet platform 720 can be communicably connected. The user device 710 can be used to acquire corresponding address information of a resource to be shared in response to a sharing request; generate a corresponding two-dimensional barcode of the address information; and publish, via a network, the generated two-dimensional barcode to the Internet platform 720.

The Internet platform 720 disclosed herein refers to, for example, an Internet social platform (e.g., QQ space, micro-blog, and/or FaceBook) that can be accessed by a corresponding client (e.g., a browser) and/or an Internet website platform (e.g., portals including Tencent, Netease, Youku, and Tudou, and/or audio and video service web sites or other types of web sites).

According to different application scenarios, the user device 710 can acquire corresponding address information of the resource to be shared in a different manner.

For example, the user device 710 can, in response to a sharing request, acquire corresponding address information of a resource to be shared that a user is currently accessing; or, in response to a sharing request, acquire corresponding address information of a resource to be shared that a user inputs; or, in response to a sharing request, acquire corresponding address information of a resource to be shared that is specified by a user via a command; or, in response to a sharing request, acquire corresponding address information of a resource to be shared that is found via a search on a network; or, in response to a sharing request, acquire corresponding address information of a resource to be shared from a configuration file. For example, the configuration file can be stored locally on the user device 710.

In some embodiments, the user device 710 can generate, automatically (e.g., when triggered by a specific event) or according to a user command, a corresponding two-dimensional barcode of the acquired address information. An algorithm that is used to generate the two-dimensional barcode can be arbitrary and randomly selected (e.g., randomly selected from a plurality of alternative algorithms), set to a default setting, or specified by a user via a command.

In some embodiments, the user device 710 can encrypt the generated two-dimensional barcode and then publish via a network the encrypted two-dimensional barcode to the Internet platform 720. In this manner, targets of resource sharing can be controlled via an encryption password. For example, targets of resource sharing can be controlled via an agreement or notification of an encryption password. When a target is not informed of an encryption password, the target cannot interpret a corresponding two-dimensional barcode of corresponding address information of a resource to be shared and thus cannot access the sharing resource.

The user device 710 as disclosed herein can be, for example, a mobile phone, a tablet computer, a personal computer, or any other suitable user device with network access capability. The function of each functional module of the user device 710 can be specifically realized according to the method described herein.

The user device 710 as disclosed herein can acquire corresponding address information of the resource to be shared, generate a corresponding two-dimensional barcode of the corresponding address information of the resource to be shared, and publish via a network the two-dimensional barcode to an Internet platform. The resource sharing is performed by publishing a two-dimensional barcode. Therefore, this can help improve security, privacy, and operational convenience of network resource sharing.

Further, by encrypting the published corresponding two-dimensional barcode of the corresponding address information of the resource to be shared, targets of the resource sharing can also be controlled. This can help further improve the security and privacy of the network resource sharing.

Figure 8:
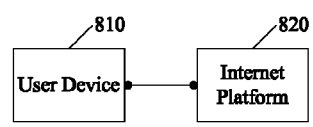
FIG. 8 depicts another exemplary communication system in accordance with various disclosed embodiments.

FIG. 8 depicts another exemplary communication system including a user device 810 and/or an Internet platform 820 as disclosed herein. The user device 810 and the Internet platform 820 can be communicably connected. The user device 810 can be used to acquire from the Internet platform 820 a two-dimensional barcode that is published via a network; interpret the two-dimensional barcode to acquire corresponding address information of a resource to be shared; and access the resource based on the address information.

The Internet platform 820 as disclosed herein refers to, for example, an Internet social platform (e.g., QQ space, microblog, and/or FaceBook) that can be accessed by a corresponding client (e.g., a browser) and/or an Internet website platform (e.g., portals including Tencent, Netease, Youku, and Tudou, and/or audio and video service web sites or other types of web sites).

In some embodiments, after acquiring the two-dimensional barcode that is published via a network from the Internet platform 820, the user device 810 can interpret, for example, automatically (e.g., when triggered by a specific event) or according to a user command, the acquired two-dimensional barcode to acquire corresponding address information of the resource to be shared.

In some embodiments, when the acquired two-dimensional barcode is encrypted, the user device 810 can acquire an encryption password to decrypt the acquired two-dimensional barcode, or the user device 810 can decrypt the acquired two-dimensional barcode according to an agreed encryption password. After decrypting the acquired two-dimensional barcode, the user device 810 can interpret the decrypted two-dimensional barcode to acquire corresponding address information of the resource to be shared. In this manner, targets of resource sharing can be controlled via an encryption password. For example, targets of resource sharing can be controlled via an agreement or notification of an encryption password. When a target is not informed of an encryption password, the target cannot interpret a corresponding two-dimensional barcode of corresponding address information of the resource to be shared and thus cannot access the sharing resource.

In some embodiments, the user device 810 can access, automatically (e.g., when triggered by a specific event) or according to a user command, the resource to be shared, based on the corresponding address information of the resource to be shared that is acquired by the analysis.

The user device 810 as disclosed herein can be, for example, a mobile phone, a tablet computer, a personal computer, or any other suitable user device with network access capability. The function of each functional module of the user device 810 can be specifically realized according to the method described herein.

Therefore, in the present embodiment, the user device 810 can acquire a two-dimensional barcode that is published via a network to an Internet platform; interpret the two-dimensional barcode to acquire corresponding address information of a resource to be shared; and access the resource based on the address information. The resource sharing is performed by publishing a two-dimensional barcode. Therefore, this method can help improve security, privacy, and operational convenience of network resource sharing.

Further, by encrypting the published corresponding two-dimensional barcode of the corresponding address information of the resource to be shared, targets of the resource sharing can also be controlled. This can help further improve the security and privacy of the network resource sharing.

An embodiment of the present disclosure provides a computer memory medium. The computer memory medium can store computer programs. When executed, the computer program can include some or all of the steps of the resource sharing methods described in the above method embodiments.

Figure 9:
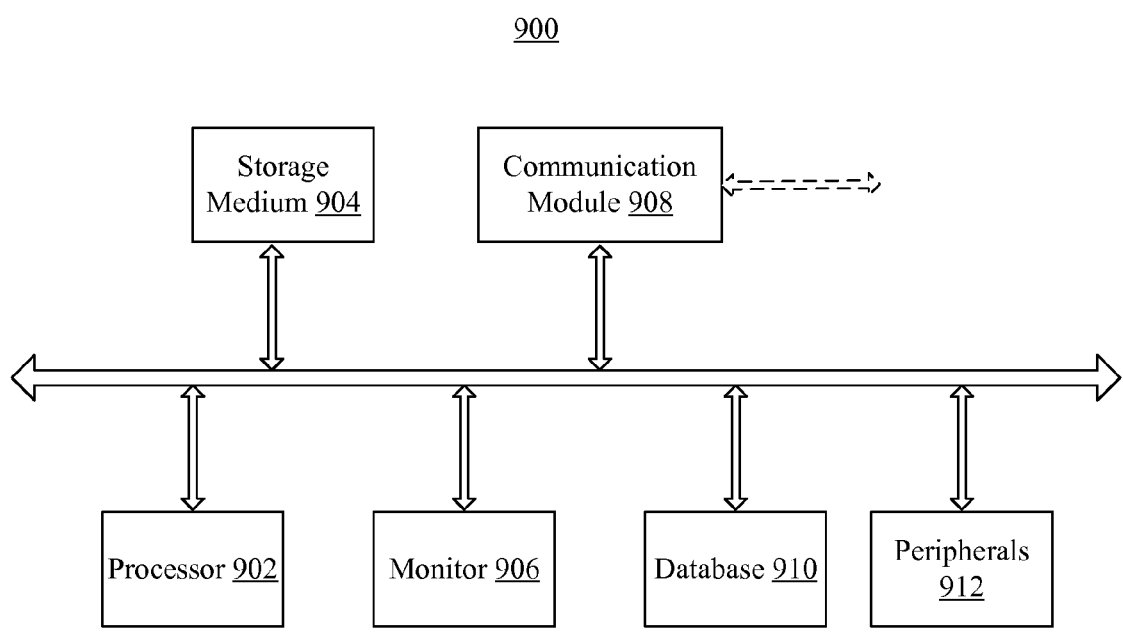
FIG. 9 depicts an exemplary user device consistent with the disclosed embodiments.

The user device may be implemented on any appropriate computing platform. FIG. 7 shows a block diagram of an exemplary computing system 900 capable of implementing the server 604 and/or the terminal 606. As shown in FIG. 9, the exemplary computer system 900 may include a processor 902, a storage medium 904, a monitor 906, a communication module 908, a database 910, peripherals 912, and one or more bus 914 to couple the devices together. Certain devices may be omitted and other devices may be included.

The processor 902 can include any appropriate processor or processors. Further, the processor 902 can include multiple cores for multi-thread or parallel processing. The storage medium 904 may include memory modules, for example, ROM, RAM, and flash memory modules, and mass storages, for example, CD-ROM, U-disk, removable hard disk, etc. The storage medium 904 may store computer programs for implementing various processes, when executed by the processor 902.

Further, the peripherals 912 may include I/O devices, for example, keyboard and mouse, and the communication module 908 may include network devices for establishing connections via a network. The database 910 may include one or more databases for storing certain data and for performing certain operations on the stored data, for example, webpage browsing, database searching, etc.

In various embodiments, the disclosed modules can be configured in one device or configured in multiple apparatus as desired. The modules disclosed herein can be integrated in one module or in multiple modules. Each of the modules disclosed herein can be divided into one or more sub-modules, which can be recombined in any manner.

One of ordinary skill in the art would appreciate that suitable software and/or hardware (e.g., a universal hardware platform) can be included and used in the disclosed methods and systems. For example, the disclosed embodiments can be implemented by hardware only, which alternatively can be implemented by software products only. The software products can be stored in a computer-readable storage (e.g., memory) medium including, e.g., ROM/RAM, magnetic disk, optical disk, etc. The software products can include suitable commands to enable user devices (e.g., including a mobile phone, a personal computer, a server, or a network device, etc.) to implement the disclosed embodiments.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Various embodiments provide methods and devices for resource sharing in order to improve security and privacy of the resource sharing. The methods and device (e.g., a user device) disclosed herein can acquire corresponding address information of the resource to be shared, generate a corresponding two-dimensional barcode of the corresponding address information of the resource to be shared, and publish via a network the two-dimensional barcode to an Internet platform. The resource sharing is performed by publishing a two-dimensional barcode. Therefore, this can help improve security, privacy, and operational convenience of network resource sharing.

Further, by encrypting the published corresponding two-dimensional barcode of the corresponding address information of the resource to be shared, targets of the resource sharing can also be controlled. This can help further improve the security and privacy for sharing the network resource.

What is claimed is:

1. A resource sharing method comprising:
accessing, by a first user device, a resource to be shared, including a webpage, an image, a video, and an audio, in response to a sharing request from a user command of a second user device;
acquiring, by the first user device, address information of the resource to be shared;
generating, by the first user device, a two-dimensional barcode of the address information of the resource, including a webpage, an image, a video, and an audio, according to a command from a first user via the first user device; and
according to a sharing command from the first user, publishing, by the first user device, the generated two-dimensional barcode to one or more of an Internet social platform, an Internet website platform, and an Internet communication application client via a network for resource sharing with the second user device.

2. The method of claim 1, wherein the acquiring of the address information of the resource comprises:
acquiring the address information of the resource to be shared that the first user is currently accessing; or
acquiring the address information of the resource to be shared input by the first user; or
acquiring the address information of the resource to be shared specified by the user command; or
acquiring the address information of the resource to be shared that is found via a search on the network; or
acquiring the address information of the resource to be shared from a configuration file.

3. The method of claim 1, wherein the publishing of the two-dimensional barcode comprises:
encrypting the two-dimensional barcode, and
publishing the encrypted two-dimensional barcode to the one or more of the Internet social platform, the Internet website platform, and the Internet communication application client via the network.

4. The method of claim 1, further comprising:
acquiring a two-dimensional barcode that is published to the one or more of the Internet social platform, the Internet website platform, and the Internet communication application client via the network;
interpreting the two-dimensional barcode to acquire address information of a resource corresponding to the two-dimensional barcode; and
accessing the resource based on the address information.

5. The method of claim 4, wherein the interpreting of the two-dimensional barcode comprises:
automatically when triggered by an event or according to a user command, interpreting the two-dimensional barcode corresponding to the address information.

6. The method of claim 4, wherein the interpreting of the two-dimensional barcode comprises:
decrypting the two-dimensional barcode that is encrypted, and
interpreting the decrypted two-dimensional barcode to acquire the address information of the resource to be shared.

7. The method of claim 1, wherein the Internet communication application client includes an Internet mail client and an Internet instant messaging client.

8. The method of claim 1, wherein the resource sharing with the second user device allows the second user device to acquire the two-dimensional barcode that is published to the one or more of the Internet social platform, the Internet website platform, and the Internet communication application client via the network; to interpret the two-dimensional barcode to acquire the address information of the resource corresponding to the two-dimensional barcode; and to access the resource based on the address information.

9. A user device comprising:
a first acquisition module, configured to access a resource to be shared in response to a sharing request from a user command of another user device, and to acquire address information of the resource to be shared, including a webpage, an image, a video, and an audio;
a generating module, configured to generate a two-dimensional barcode of the address information acquired by the first acquisition module; and a publishing module, configured to publish, via a network, the two-dimensional barcode generated by the generating module to one or more of an Internet social platform, an Internet website platform, and an Internet communication application client via a network for resource sharing with the another user device.

10. The device of claim 9, wherein the first acquisition module is configure to:
in response to the sharing request, acquire the address information of the resource to be shared that a user is currently accessing; or
in response to the sharing request, acquire the address information of the resource to be shared that a user inputs; or
in response to the sharing request, acquire the address information of the resource to be shared that is specified by the user command; or
in response to the sharing request, acquire the address information of the resource to be shared that is found via a search on the network; or
in response to the sharing request, acquire the address information of the resource to be shared from a configuration file.

11. The device of any claim of claim 9, wherein the publishing module is configured to encrypt the two-dimensional barcode generated by the generating module and to publish, via the network, the encrypted two-dimensional barcode to the one or more of the Internet social platform, the Internet website platform, and the Internet communication application client.

12. The device of claim 9, further including:
a second acquisition module, configured to acquire a two-dimensional barcode that is published to the one or more of the Internet social platform, the Internet website platform, and the Internet communication application client via the network;
an interpreting module, configured to interpret the two-dimensional barcode acquired by the second acquisition module to acquire address information of a resource; and
an accessing module, configured to access the resource based on the address information acquired by the interpreting module.

13. The device of claim 12, wherein the interpreting module is configured to interpret, automatically when triggered by an event or according to a user command, the two-dimensional barcode corresponding to the address information.

14. The device of claim 12, wherein the interpreting module is configured to decrypt the two-dimensional barcode that is encrypted and to interpret the decrypted two-dimensional barcode to acquire the address information of the resource.

15. A resource sharing method comprising:
accessing, by a first user device, a resource to be shared in response to a sharing request from a user command of a second user device;
acquiring, by the first user device, address information of the resource to be shared, including a webpage, an image, a video, and an audio;
generating, by the first user device, a two-dimensional barcode of the address information of the resource, when triggered by an event; and
when triggered by an event, publishing, by the first user device, the generated two-dimensional barcode to one or more of an Internet social platform, an Internet website platform, and an Internet communication application client via a network for resource sharing with the second user device.

16. The method of claim 15, wherein the Internet communication application client includes an Internet mail client and an Internet instant messaging client.

17. The method of claim 15, wherein the publishing of the two-dimensional barcode comprises:
encrypting the two-dimensional barcode, and
publishing the encrypted two-dimensional barcode to the one or more of the Internet social platform, the Internet website platform, and the Internet communication application client via the network.

* * * * *